Jan. 5, 1971 W. ROTH 3,553,713

EVENT RECORDER WITH RECORDING RATIO-IDENTIFYING MEANS

Filed March 24, 1969 3 Sheets-Sheet 1

INVENTOR
Werner ROTH

By

Michael S. Striker his ATTORNEY

EVENT RECORDER WITH RECORDING RATIO-IDENTIFYING MEANS

Filed March 24, 1969 3 Sheets-Sheet 2

INVENTOR
Werner ROTH
By his ATTORNEY

EVENT RECORDER WITH RECORDING RATIO-IDENTIFYING MEANS

Filed March 24, 1969

INVENTOR
Werner ROTH
By his ATTORNEY

United States Patent Office 3,553,713
Patented Jan. 5, 1971

3,553,713

EVENT RECORDER WITH RECORDING RATIO-IDENTIFYING MEANS

Werner Roth, Buchenberg, Germany, assignor to Kienzle Apparate GmbH, Villingen, Black Forest, Germany Filed Mar. 24, 1969, Ser. No. 809,787
Claims priority, application Switzerland, Mar. 22, 1968, 4,273/68
Int. Cl. G01d 9/04
U.S. Cl. 346—65 10 Claims

ABSTRACT OF THE DISCLOSURE

Repeated events, such as the production of finished workpieces, can be recorded on a record carrier at different reduction ratios so that the recordings are space sufficiently and suitably for automatic counting. The record carrier also receives punched cutouts identifying the reduction ratio, or the ratio 1:1, at which the events were recorded. By manual operation of a knob, the ratio and corresponding identifying cutouts are simultaneously selected. The punching of the identifying cutout is also effected by a manual operation, preferably by closing the lid of the housing.

BACKGROUND OF THE INVENTION

Recording apparatus is known in which a recording arm produces radial lines on a rotating record carrier disc representing repeated events such as working strokes of a machine, or completion of a workpiece. Generally, the recording point moves along a circular or spiral-shaped path on the rotating record carrier disc, and is radially displaced for making a short radial line for each event.

It is a great advantage of recordings of this type that it is possible to count the recorded lines to obtain information regarding the number of operations and flow of finished workpieces. However, if the controlling events are very rapidly repeated, the density of the radial recorded lines becomes so great that it is difficut to evaluate the recordings.

It would be possible to increase the rotary speed at which the record carrier disc rotates so that the radial recorded lines are spaced greater distances in circumferential direction. The disadvantage is that more space is required on the record carrier for the recordings so that the record carrier disc have to be frequently replaced. Furthermore, it is advantageous to rotate the record carrier disc at a speed corresponding to one complete revolution per day, or per length of a working shift, which would require a number of different record carrier discs rotating at different speeds.

The German Pat. 1,159,633 discloses a recording device in which every tenth recorded line is made longer than the other lines so that only the long lines have to be visually counted, and the counted number multiplied by ten. However, if the recordings are to be automatically counted by a machine, it is necessary to optically separate the very closely spaced short and long radial recording lines. Even a small eccentricity of the recordings in relation to the axis of rotation of the record carrier disc may cause inaccurate results.

In another apparatus according to the prior art a zigzag-shaped recording is made of unit representing lines, and the peaks of the recording represent multiples of the individual recordings. Such a zigzag recording requires a great deal of space on the record carrier disc, and is very difficult to evaluate by automatic optical counting devices.

SUMMARY OF THE INVENTION

It is one object of the invention to record rapidly repeated events in such a manner that the recordings can be automatically counted for evaluation of the number of events within a time period.

Another object of the invention is to record repeated events by recordings whose number is proportionate to, but smaller than the number of events.

Another object of the invention is to record repeated events at a selected reduction ratio which is one of a plurality of possible ratios, and to record on the record carrier also a recording identifying the selected ratio.

Another object of the invention is to provide a single manually operated member for selecting the recording ratio, and for producing an identifying recording representing the simultaneously selected ratio.

With these objects in view, the present invention provides an apparatus for recording repeated events, such as operations of a machine, working strokes, or completion of a workpiece.

In accordance with the invention, the number of recordings is proportionate to the number of events at such a reduction ratio that the recordings are spaced far enough for automatic counting and evaluation. When the recording ratio is selected by a manual operation, another recording means is automatically set to record on the record carrier a recording identifying the selected recording ratio.

One embodiment of the invention comprises an impulse generator for producing an impulse for each event which is to be recorded and counted; a frequency converter receiving the impulses and having a plurality of conditions for producing output impulses at frequencies reduced at selected ratios; first recording means receiving the output impulses for recording on a record carrier countable main recordings corresponding to the output impulses; second recording means having a plurality of identifying positions for making on the record carrier identifying recordings representing the selected ratio; first control means for setting the frequency converter to a selected one of said conditions; second control means for setting the second recording means to one of the identifying positions; and manually operated means for simultaneously operating the first and second control means, and for actuating the second recording means. By operation of the second control means, the second recording means is set to the identifying position which corresponds to the selected condition of the frequency converter. When the second recording means are actuated, an identifying recording is produced on the record carrier by which the selected ratio at which the main recordings were made is identified. When the main recordings are counted, the number of events can be determined by consideration of the selected ratio at which the events were recorded.

In the preferred embodiment of the invention, the record carrier is a rotary disc rotating at constant speed and making, for example, one revolution in twenty-four hours. The first recording means draw a circular line on the rotating record carrier disc, and a short radial line when receiving an output impulse.

The second recording means preferably include punch means which are positioned to make the identifying recordings in the form of cutouts in the peripheral margin of the record carrier disc. A plurality of cutouts is preferably made by a corresponding plurality of punches in different positions so that the combination of cutouts made or not made by first and second punches constitutes an identifying recording.

A single manually operated knob is preferably provided which can be turned between a plurality of positions respectively representing recording ratios. Cam means turned by the knob operate switches connected to the output of the frequency converter so that the respective ratio is selected, while the punches are turned to assume a corresponding identifying position.

By axial movement of the manually operated knob, punches are actuated to make cutouts in the record carrier disc. In the preferred embodiment, closing of a lid or cover causes the same to engage the knob and push the same in axial direction to actuate the punches.

The apparatus of the invention produces recordings which can visually, as well as automatically be counted and evaluated due to the fact that by selection of the recording ratio, which may be 10:1 or 100:1, the recordings can be spaced just the distance required for evaluation, irrespective of a very high frequency of the recorded events, and without adapting the speed of the record carrier to the frequency of the events.

Since the setting of the punches must be carried out simultaneously with the selection of the recording ratio, each record carrier is provided with an identification of the ratio which was used in recording the events, and incorrect identification is not possible.

If punched cutouts are made in the peripheral margin of the record carrier, valuable space on the record carrier is left for other recordings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
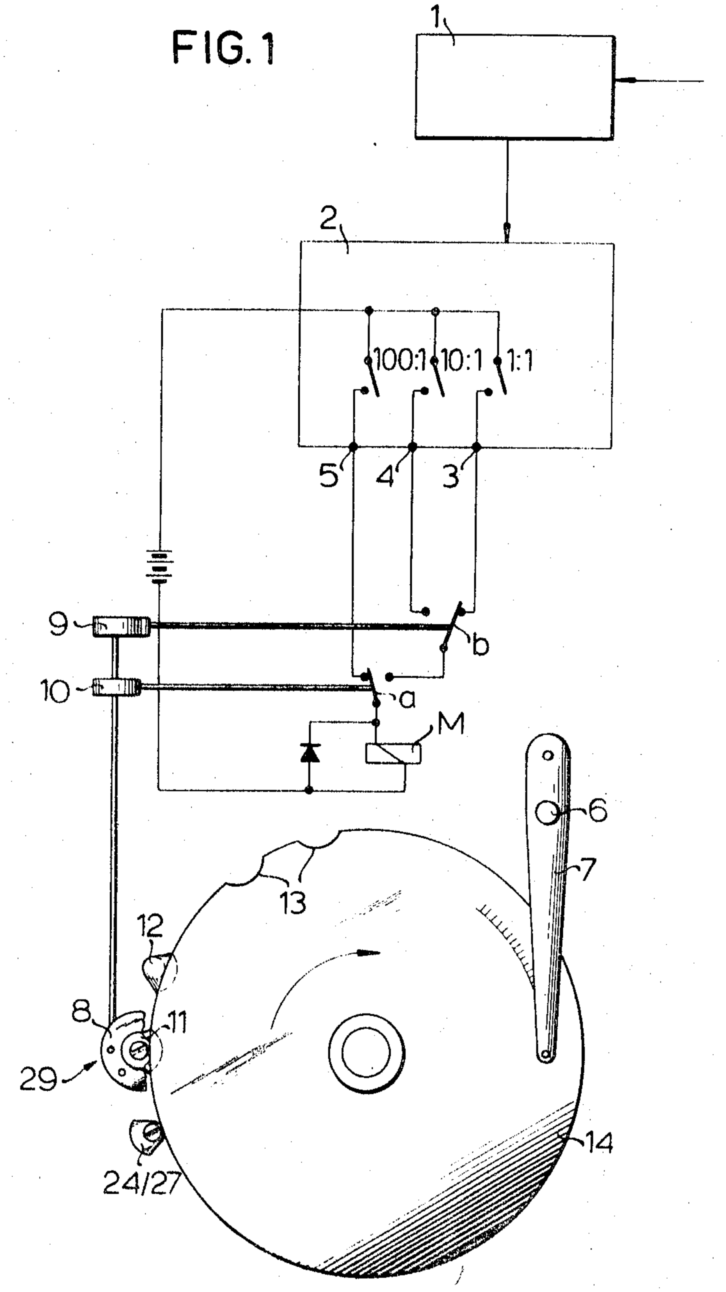
FIG. 1 is a diagrammatic view schematically illustrating an apparatus according to one embodiment of the invention.

Referring first to the diagrammatic FIG. 1, an impulse generator 1 of conventional construction is controlled in a manner known to those skilled in the art to produce an impulse for each stroke of a part of a machine, or for each completed and discharged workpiece, or for any other event which is repeated at a high frequency. The impulses produced by impulse generator 1 are supplied to the input of a frequency converter 2 of conventional construction which may operate mechanically or electrically, like a read-out-counter and which includes three output switches 3, 4, 5 which can be opened and closed by the impulses produced by the impulse generator 1. Output switches 3, 4, and 5 are respectively correlated with the ratios 1:1, 10:1, and 100:1 so that the number of output impulses produced by closing the output switch 3 is the same as the number of impulses produced by impulse generator 1. The number of output impulses produced by closing output switch 4 is only one-tenth of the number of the impulses produced by the impulse generator, and the number of output impulses produced by closing output switch 5 is only one-hundredth of the number of impulses produced by impulse generator 1.

The output means 3, 4 and 5 of the frequency converter are respectively connected to the stationary contacts of the switches *a* and *b* which can be set by cams 9 and 10 to connect one of the output means 3, 4 and 5 to an electromagnet M which for each output impulse, produces an angular stroke of a recording arm 7 mounted on a pivot 6 so that each output impulse is represented by a short radial line on record carrier disc 14 which turns at constant speed. Between the impulses, the recording arm 7 moves along a circular line having its center in the axis of rotation of record carrier disc 14.

If output switch 5 is closed and switch *a* connected to the same, one radial line will be recorded for each one hundred events and impulses produced by impulse generator 1, and if output switches 4 or 3 are closed and respectively connected by switch *b* and switch *a* with electromagnet M, a radial line will be recorded for every tenth event, or for each event, respectively. Any of the output switches 3, 4 and 5 may be left open if the respective ratio is not intended to be used. Other ratios can be quickly selected by operation of switches *a* and *b* by cams 9 and 10 under the control of the manually operated knob 8.

The record carrier disc 14 has a central opening through which a holding member projects which clamps the marginal portion bounding the central opening of the record carrier disc 14, so that the same can be rotated at a constant speed in the direction of the arrow. Disc 14 rests on a supporting surface which is located inwardly of the peripheral marginal portion of disc 14 so that cutouts 13 can be made in this portion by punches 25, 26, 27.

Figure 2:
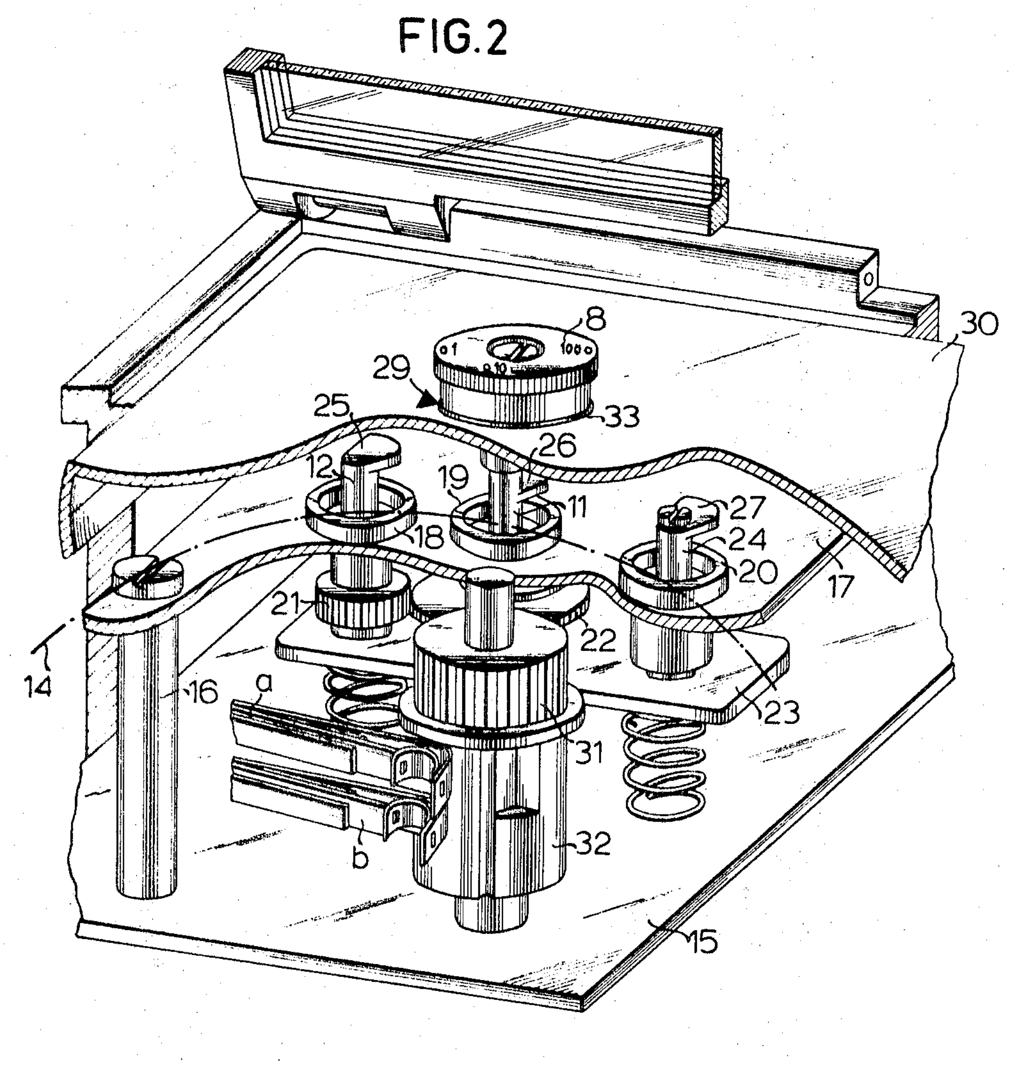
FIG. 2 is a fragmentary perspective view illustrating the manually operated parts of the apparatus.
Figure 3:
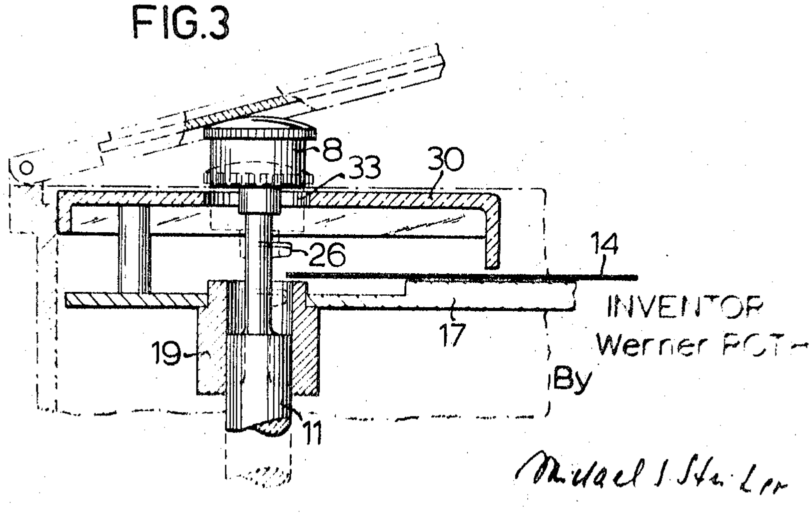
FIG. 3 is a fragmentary sectional view illustrating the punching of a record carrier disc; and FIGS. *4a*, *4b* and *4c* are fragmentary plan views illustrating identifying positions of manually set punches.

Referring now to FIG. 2, a supporting plate 15 is mounted in a housing, not shown, in which the recording device, not shown in FIG. 2, is mounted. Screws and spacing tubes 16 support a punch plate 17 at a selected distance from support plate 15. Three bushings 18, 19 and 20 are mounted in corresponding holes of punch plate 17, and have annular portions located above the same, and provided with inner circular edges cooperating with circular edges of sector-shaped punches 25, 26, 27 which are projecting portions of punch means 12, 11, and 24 which are guided in bushings 18, 19 and 20 for axial and turning movements, as best seen in FIG. 3. A record carrier disc can be inserted through a slot in the housing to assume the positions shown in FIGS. 3, *4a*, *4b* and *4c* in which the periphery of the record carrier disc 14 is located between the cutting edges of the bushings 18, 19 and 20, and the projecting punches 25, 26 and 27 so that downward movement of a punch means 12, 11, 24 which is in such an angular position that its punch portion projects above the marginal portion of disc 14, makes a peripheral cutout in disc 14 when the punch means 12, 11, 24 are lowered into the interior of bushings 18, 19 and 20.

The lower piston-shaped portions of punch means 12, 11, 24 are mounted for turning movement in a movable actuator plate 23 which is supported on support plate 15 by coil springs **23*a*. When actuator plate 23 is moved toward or away from support plate 15, punch means 12 are moved in axial direction between the illustrated inoperative position, and a lower punching position located within bushings 18**.

A manually turnable knob 8 is secured to punching means 11, and can be turned with the same between three positions in which indicia thereon register with an indicator mark 29 provided on a top plate 30. The indicia on the knob 8 represent the ratios 1:1, 10:1, and 100:1. A gear 22 is secured to punching means 11 and turns with the same and knob 8, meshing with a smaller gear 21 secured to punching means 12 for turning movement with the same.

As best seen in FIGS. *4a*, *4b* and *4c*, the transmission ratio between gears 22 and 21 is selected so that in a first position of knob 8, both punches 25 and 26 are located above the marginal peripheral portion of record carrier disc *4a*. In the position of FIG. *4b*, both punches 25 and 26 are turned to a position outside of the periphery of record carrier disc 14. In the position of FIG. *4c*, punch 26 is spaced from the periphery, and punch 25 overlaps the periphery of the record carrier disc 14 so that in the position of FIG. *4a*, two cutouts are made in the peripheral margin of the record carrier disc 14, in the position of FIG. 4*b* no cutouts are made, and in the position of FIG. 4*c* one cutout is made by punch 25 when knob 8 is pushed downward in axial direction together with punch 11, and actuator plate 23 which pulls punch 12 downward for simultaneous actuation of punches 25 and 26. Punch means 25 is not rotated by knob 8, but is set to a punching or non-punching angular position, making a third cutout in the peripheral margin of record carrier disc 14 if actuated in the punching position by knob 8 and actuator plate 23.

A cam shaft having cam portions 32 is mounted in bearing bores in plates 15 and 17 for turning movement, and carries a fixed gear 31 meshing with gear 22 so that turning of knobs 8, also effects turning of the cam means 32 by which switches *a* and *b*, whose function was described with reference to FIG. 1, are controlled. Since gear 22 moves in axial direction with actuator plate 23, the axial length of gear 31 is selected to be sufficient to maintain a meshing engagement between gears 22 and 31 in all axially displaced positions of gear 22 and knob 8.

When the lid or cover of the housing is closed, its inner surface engages the top surface of knob 8 and pushes the same downward in axial direction together with punch means 11, whose movement is transmitted to punch means 12 by the actuator plate 23. The punching motion is also transmitted to punch means 24 by the actuator plate 23.

Assuming now that a series of events, such as automatic discharges of completed workpieces from an automatic machine tool are to be recorded, the ejector for the workpiece, not shown, is operatively connected with the impulse generator 1 so that for each discharging event, an impulse is created. Assuming further that the frequency of the discharging event is fairly high, the operator selects the recording ratio of 10:1 by turning knob 8 to the position in which indicia 10 registers with the indicator mark 29 on the preferably transparent top plate 20, in which position knob 8 is arrested by a conventional resilient catch, not shown. The output switches 3, 4 and 5 of the frequency converter 2 are assumed to be closed, but it would also be possible to leave the output switches 3 and 5 open.

Turning of knob 8 effects turning of the meshing control gears 21 and 22 by which punch means 12 and 11 are set. It is assumed that the selected ratio 10:1 is represented by two cutouts 13 produced by punches 25, 26 in the positions shown in FIG. 4*a* in which the punches 25 and 26 project over the peripheral marginal portion of a record carrier disc 14 which is clamped under a central post and rotated by the same.

At the same time, turning of knob 8 and control gear 22 effects turning of control gear 31 and control cam means 9, 10, 32 so that switches *a* and *b* assume a position connecting output means 4 with magnet M, as shown in FIG. 1.

In this condition of frequency converter 2, an output impulse reaches electromagnet M for every ten impulses produced by impulse generator 1, and consequently the number of radial recorded lines produced by the first recording means M–7 on the rotating disc 24 is one tenth of the number of discharges of workpieces so that each radial line represents ten workpieces. The radial lines are suitably spaced for automatic counting and evaluation by an automatic apparatus. If the frequency of the discharges of the workpieces would be much higher, the recording at a reduction ratio of 10:1 may result in extremely closely spaced recorded radial lines, in which event the apparatus would be set to a recording ratio of 100:1 by turning knob 8 to the position in which indicia 100 registers with indicator mark 29. If the frequency of the discharges of workpieces wounld be very low, the radial recorded lines would be spaced too far in circumferential direction, and the frequency converter could be set to the ratio 1:1 by turning knob 8 to the respective position.

Figure 4A:
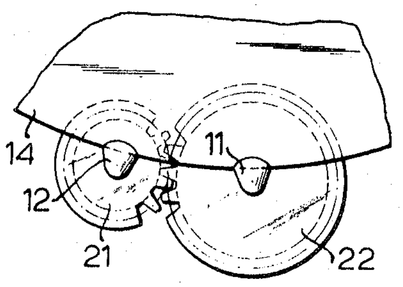
Figure 4B:
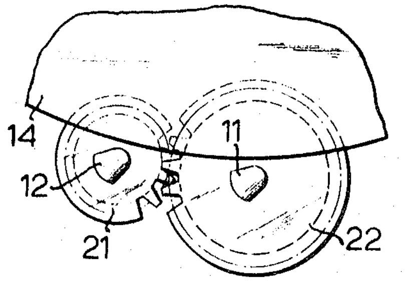
Figure 4C:
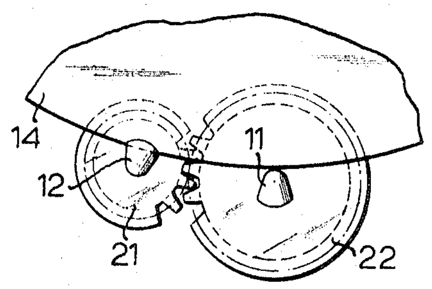

While first control means including switches *a*, *b*, cam means 9, 10 on cam shaft 32, and gear 31 effects setting of the frequency converter 2 to a selected recording ratio of 10:1, second control means including gears 22 and 21 set the punch means 12 and 11 to the position shown in FIG. 4*a*.

When the recording has been completed, knob 8 is manually operated, or the lid of the housing is closed. Knob 8 is downwardly depressed so that actuating plate 23 actuates punches 25 and 26 to produce on the record carrier identifying recordings in the form of punched out cutouts 13. These cutouts represent the selected recording ratio so that the person handling the record carrier disc 14, is informed how many workpieces are represented by one radial recorded line on the record carrier disc. Since the punches may be replaced by other recording means, they can be considered as second recording means for making on the record carrier identifying recordings representing the selected ratio.

The lower edge of punches 25, 26, 27 is shapened so that the cutouts 13 are neatly made in cooperation with the circular inner cutting edges of bushings 18, 19 and 20.

It is evident that the ratios could be indicated by a plurality of indicia on the top plates 30, and a single indicator mark provided on knob 8.

The opening 33 preferably has such a diameter that the lower portion of knob 8 can move downward in the same, while the upper portion of knob 8 has a greater diameter and serves as a stop limiting the downward actuating movement of knob 8. The illustrated preferred construction of the punching means for producing the identifying cutouts in the record carrier disc 14, has the particular advantage that after closing of the lid, actuation of knob 8, and punching of cutouts in the marginal portion of disc 14, fraudulent opening and closing of the lid, cannot produce additional identifying cutouts since the record carrier disc 14, which is clamped only in the region of its central portion, is bent upward by punching portions 25 and 27 which are already located under the uncut marginal peripheral portion of the record carrier disc 14 due to the rotation of the same. Since the punches 25, 26 remain under the peripheral margin of the record carrier disc 14, closing of the lid and downward movement of knob 8 cannot effect another punching of the record carrier disc which remains on top of the punches 25, 26, 27.

It will be understood that each of the elements described above, or two or more together, may also find a useful application in other types of apparatus for recording repeated events differing from the types described above.

While the invention has been illustrated and described as embodied in a manually operated means for simultaneously selecting a recording ratio and effecting identification of the recording ratio on the record carrier, it is not intended to be limited to the details shown, since various modifications and structural changes may be made without departing in any way from the spirit of the present invention.

What is claimed as new and desired to be protected by Letters Patent is set forth in the appended claims.

I claim:

1. Apparatus for recording repeated events, comprising, in combination, an impulse generator for producing an impulse for each event; a frequency converter receiving said impulses and having a plurality of conditions for producing output impulses at frequencies reduced at selected recording ratios; means for transporting a record carrier at a constant speed; first recording means receiving said output impulses for recording on said record carrier countable main recordings corresponding to said output impulses; second recording means having a plurality of identifying positions for making on said second record carrier identifying recordings representing the selected recording ratio; first control means for setting said frequency converter to a selected one of said conditions; second control means for setting said second recording means to one of said identifying positions; and manually operated means for simultaneously operating said first and second control means so that said second recording means is set to the identifying position which corresponds to the selected condition of said frequency converter, and for actuating said second recording means to produce on said record carrier an identifying recording identifying the selected recording ratio so that said main recordings can be counted, and evaluated under consideration of the selected ratio at which said events were recorded.

2. Apparatus as claimed in claim 1 comprising supporting means; wherein said manually operated means is mounted on said supporting means for turning movement between a plurality of positions associated with different recording ratios and operate said first and second control means when turned between said positions; and wherein said manually operated means is mounted on said supporting means also for axial movement for actuating said second recording means.

3. Apparatus as claimed in claim 1 wherein said first recording means includes an electromagnet receiving said output impulses, and a recording member operated by said electromagnet to make radial main recordings on said record carrier circumferentially spaced in accordance with the selected recording ratio; and wherein said second recording means includes punch means for punching into said record carrier identifying cutouts which constitute said identifying recordings representing the selected recording ratio.

4. Apparatus as claimed in claim 1 wherein said manually operated means is turnable; wherein said first control means include switch means connected with said frequency converter for setting the same to a selected one of said plurality of conditions, and control cam means connected with said manually operated means for turning movement, and controlling said switch means in accordance with the turned position of said manually operated means and of said cam means; wherein said second recording means includes punch means turnable between inoperative and operative positions and axially movable to and from a punching position for making in said record carrier identifying cutouts; wherein said second control means include gear means connecting said manually operated means with said punch means; and wherein said manually operated means is connected with said punch means for axial movement so that by axial movement of said manually operated means, said punch means is moved to said punching position for punching into said record carrier at least one cutout constituting said identifying recording for representing the recording ratio selected by turning of said manually operated means.

5. Apparatus as claimed in claim 1 wherein said second recording means includes punch means settable by said manually operated means to a plurality of positions respectively correlated with different recording ratios, and being operable by said manually operated means to punch into said record carrier different identifying cutouts respectively identifying the selected recording ratio.

6. Apparatus as claimed in claim 5 comprising a housing; and wherein said manually operated means includes a lid mounted on said housing for movement between an open position and a closed position; and wherein said lid operates said punch means when manually moved to said closed position.

7. Apparatus as claimed in claim 6 wherein said punch means include a plurality of punches connected for turning movement, and for axial movement to a punching position; wherein said manually operated means include a knob connected with said punch means for turning movement between a plurality of positions respectively correlated with said recording ratios, and for axial movement with the same to said punching position; and wherein said lid engages said knob during movement to said closed position for displacing the same and said punch means in axial direction until said punch means moves to said punching position.

8. Apparatus as claimed in claim 1 wherein said second recording means includes a stationary punch plate, a plurality of bushings mounted in said punch plate, each bushing having an inner annular cutting edge, a plurality of punches respectively mounted in said bushings for turning, and axial punching movement, each punch having a cutting edge cooperating with said inner annular cutting edge of the respective bushing, an actuator plate secured to said punches and being movable with the same, and biasing means urging said actuator plate to a normal position in which said punches are spaced from said inner annular cutting edge; and wherein said manually operated means include a knob fixedly secured to one of said punches for turning and axial movement so that said punches are set by turning said knob, and actuated by axial movement of said knob; and wherein said second control means include control gears connecting said punches for turning movement.

9. Apparatus as claimed in claim 8 wherein said transporting means support and rotate said record carrier in a plane perpendicular to the direction of axial punching movement of said punches and disposed so that the peripheral marginal portion of said record carrier is located between said inner annular cutting edges of said bushings, and the respective punches; wherein said gears connect said punches for turning movement at different speeds so that said punches can be set to punch different combinations of cutouts in said record carrier.

10. Apparatus as claimed in claim 9 wherein said first control means include control cam means mounted for rotation, a gear connecting said cam means with one of said gears for rotation, switch means operated by said cam means and being connected with said frequency converter for setting the same to a selected one of said plurality of conditions; and wherein said first recording means include an electromagnet receiving said output impulses, and a recording arm having a recording point cooperating with said record carrier and being oscillated by said electromagnet to record radial lines on said record carrier whenever said electromagnet receives an output impulse; and wherein said frequency converter includes a plurality of output means respectively correlated with different recording ratios, and connected with said switch means so that said switch means connect different output means of said frequency converter with said electromagnet in different turned positions of said knob.

References Cited

UNITED STATES PATENTS

| | | | |
|---|---|---|---|
| 3,153,562 | 10/1964 | Witzany | 346—65X |
| 3,192,532 | 6/1965 | Bruchschmidt | 346—123X |
| 3,454,953 | 7/1969 | Lloyd et al. | 346—23 |

JOSEPH W. HARTARY, Primary Examiner

U.S. Cl. X.R.

346—51, 123